United States Patent [19]
Brown et al.

[11] 3,770,353
[45] Nov. 6, 1973

[54] ELECTRO-OPTICAL SENSOR
[75] Inventors: Charles H. Brown, Phoenix, Ariz.;
Frederic L. Miller, San Diego, Calif.
[73] Assignee: The United States of America as represented by the Secretary of the Navy
[22] Filed: Aug. 25, 1971
[21] Appl. No.: 174,918

Related U.S. Application Data
[63] Continuation of Ser. No. 786,839, Dec. 19, 1968, abandoned.

[52] U.S. Cl. .............................. 356/152, 250/220 R
[51] Int. Cl. .......................................... G01b 11/26
[58] Field of Search .......................... 356/141, 152; 250/219 DR, 220 R, 231 R

[56] References Cited
UNITED STATES PATENTS
3,369,445  2/1968  Kohl .................................. 356/152
3,502,894  3/1970  Scherr ............................. 250/231 R Primary Examiner—Richard A. Farley
Attorney—Thomas O. Watson, Jr.

[57] ABSTRACT

This invention is directed to an electro-optical sensor which can accurately measure small displacements. The sensor utilizes a modulated light source and has a shutter whose displacement controls the light which impinges on a pair of phototransistors. The phototransistors are connected to a transformer and their output is a measure of the displacement of the shutter.

10 Claims, 1 Drawing Figure

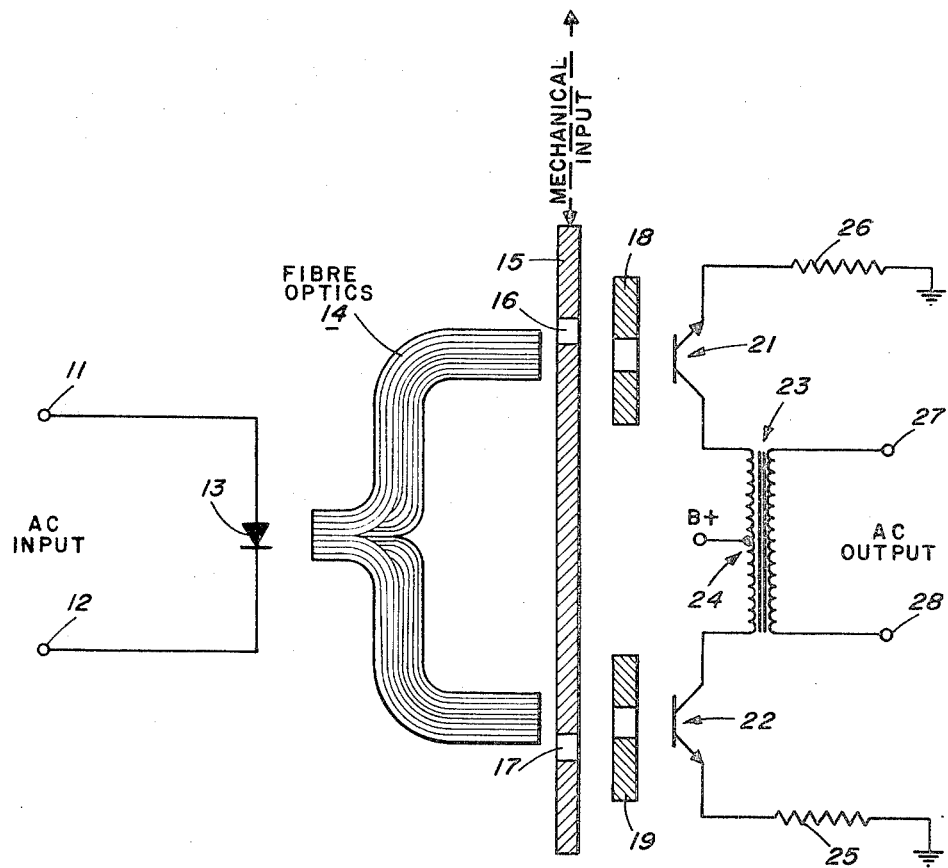

ELECTRO-OPTICAL SENSOR

This case is a continuation of now abandoned U. S. Pat. application Ser. No. 786,839, filed Dec. 19, 1968, by Charles H. Brown et al., for Electro-Optical Sensor.

STATEMENT OF GOVERNMENT INTEREST

The invention defined herein may be manufactured and used by or for the Government of the United States of America for governmental purposes without the payment of any royalties thereon or therefor.

FIELD OF THE INVENTION

1. Background of the Invention

This invention is directed to an electro-optic sensor. It is utilized to provide accurate measurements of small displacements such as those provided by an accelerometer sensor, a force transducer, a pressure transducer or the like.

2. Description of the Prior Art

Sensors utilized in the prior art to measure displacement had two major disadvantages. In the first place the reaction force between the sensor and the object whose displacement was measured introduced inaccuracies into the measurements.

In the second instance the prior art sensors could not be used in redundant systems where fail passive operation is essential. Additionally, the prior art displacement sensors were relatively large and complex and required very complex accurate construction methods.

SUMMARY OF THE INVENTION

The inventive sensor yields highly accurate outputs and represents a significant advance ovethe prior art. By converting light to electricity the sensor exerts a near zero reaction force on the object whose displacement is to be measured. The sensor provides fail passive operation because upon failure its output falls to zero or a lower gradient and not to a hard or steady state output and is therefore useful in redundant systems. Furthermore, the silicon phototransistors utilized provide an amplification of the measured signal in addition to converting its energy form.

The design of the inventive circuit is very simple and it is easy to construct. Furthermore, since the phototransistor may be made by photo-etching or similar microelectronic techniques, the size of the sensor may be extremely small.

The inventive sensor utilizes a light source activated by alternating current to energize two phototransistors. A shutter attached to a pressure transducer or the like controls the light which impinges on the phototransistors. The collectors of the phototransistors are connected in a push-pull arrangement to either side of a center tapped transformer. A direct current supply is connected to the center of the transformer. The output of the sensor is taken from the secondary winding of the transformer and is a function of the position of the shutter.

It is an object of this invention to provide an electro-optical sensor which yields accurate results.

It is a further object of this invention to provide a fail passive electro-optical sensor.

It is a further object of this invention to provide an electro-optical sensor which exerts a zero reaction force on the transducer to which it is connected.

BRIEF DESCRIPTION OF FIGURES

These and other objects, advantages and novel features of this invention will become apparent from the following detailed description and drawing wherein the FIGURE sets forth the inventive circuit.

DESCRIPTION OF PREFERRED EMBODIMENTS

The sensor receives an alternating current input signal at terminals 11 and 12 and passes it to a gallium arsenide diode 13 where it is converted to light. If desired, an incandescent light could be used in place of the diode.

Optical fibres 14 are used to conduct the light to shutter 15. Shutter 15 is connected to a pressure transducer or the like so as to move relative to the fibre opticas and apertures 18 and 19. Since the movement of the shutter is unimpeded, it exerts little or no reaction force on the transducer.

The shutter has two slits the first of which 16 is associated with aperture 18 and the second of which 17 is associated with aperture 19 as seen in the drawing. The placement of these openings is such that only one opening will pass light from fibre optics 14 to its associated aperture at any given position of the shutter.

Phototransistors 21 and 22 are mounted adjacent to apertures 18 and 19. The collectors of the phototransistors are connected to a center-tapped transformer 23 and the emitters are connected to ground through resistors 26 and 25. A direct current source is connected to the center tap 24 of transformer 23. The transformer is designed to prevent shorting of the primary to the secondary windings.

The phototransistors are very sensitive to light and yield very accurate results. They may be made by photoetching or similar techniques. Their accuracy and size facilitate the simplicity of design apparent in the inventive circuit.

In operation, the input source at 11 and 12 alternately excites the diode 13 which then emits modulated light. This light is conducted to shutter 15 by fibre optic 14.

The displacement of shutter 15 is controlled by the transducer to which it is connected. When slit 16 is aligned with aperture 18, phototransistor 21 will be energized and when slit 17 is aligned with aperture 19, phototransistor 22 will be energized. The light gives a forward bias to the transistors and their conduction is controlled by the amount of light received.

When the phototransistors are turned on, the conduction path is from the direct current source connected at 24 through transformer 23, phototransistor 21 or 22, and resister 26 or 25 to ground.

The photoelectric circuit amplifies the modulated light received at the phototransistors. The amplification is analogous to that achieved when an electric signal is received at the base of a transistor amplifier. The modulated light from 13 causes the phototransistors to turn on and off. This on and off operation in turn provides an A. C. pulsed output at terminals 27 and 28 of transformer 23. The amplitude of the pulses will be a function of the amount of light received by phototransistors 21 and 22 which is in turn a function of the displacement of shutter 16 caused by the pressure transducer or the like. The transformer isolates the amplified alternating current signal from the direct current source to provide fail passive operation if any of the phototransistor circuit components short.

A variety of utilization circuits may be connected to the output of the transformer. These circuits may present a visual display correlated to provide an indication of the parameter measured or they may initiate a variety of circuits which are responsive to various levels of the parameters measured.

It is seen then that a new and highly accurate electro-optical sensor has been provided. The sensor exerts little or no reactive force on the member to be measured and its operation is fail passive.

What is claimed is:

1. An electro-optical sensor for sensing the displacement of a transducer comprising:
   a light source;
   an alternating current supply connected across said light source;
   an apertured shutter having first and second apertures for attachment to a transducer to be displaced thereby and operable to control the light received by a photoelectric detector;
   a photoelectric detector mounted adjacent to the apertured shutter on one side thereof,
   said photoelectric detector utilizing two phototransistors,
   one of said phototransistors being mounted adjacent to said first aperture in said shutter and the other phototransistor being mounted adjacent to said second aperture in said shutter,
   said photoelectric detector being operable to receive light from said source to convert the received light to an electric signal;
   output means providing an electrical output which is proportional to the light received by said detector,
   said output means comprising a centertapped transformer connected to the collectors of said two phototransistors, a direct current source connected to said center tap and a pair of resistors connected between the emitters of said phototransistors and ground; and
   a pair of light pipes each having one end mounted adjacent to said light source and one end adjacent to said first or second apertures in said shutter.

2. An electro-optical sensor for sensing the displacement of a transducer as in claim 1 wherein said light source is a gallium arsenide diode.

3. An electro-optical sensor for sensing the displacement of a transducer as in claim 1 wherein said light source is a lamp.

4. A photoelectric sensor comprising:
   means for sensing mechanical movement and for providing a physical response to such movement;
   means for illuminating said movement sensing means with light;
   means for receiving said light in an amount that varies with the magnitude of the physical response of said movement sensing means, said light receiving means comprising one phototransistor;
   means for providing an electrical output signal which is proportional to the amount of light received by said light receiving means and operable to prevent an output signal from being generated in response to a shorting failure of said phototransistor.

5. A photoelectric sensor as in claim 4, wherein the movement sensing means comprises a transducer which senses mechanical movement and an apertured shutter which is displaced by said transducer to produce said physical response.

6. A photoelectric sensor as in claim 4, wherein:
   said light receiving means comprises a plurality of phototransistors;
   said movement sensing means comprises a shutter having a plurality of apertures corresponding to the number of phototransistors; and
   said light receiving means and said apertured shutter are arranged so that one of said phototransistors is mounted adjacent to its corresponding aperture in said shutter.

7. A photoelectric sensor as in claim 4 wherein said illuminating means is a modulated light source.

8. A photoelectric sensor as in claim 7 wherein:
   said output means comprises a transformer which provides
   a. an electrical output signal when said phototransistor is operative and receives said modulated light; and
   b. no electrical output when said phototransistor is opened or shorted, even though said phototransistor receives said modulated light.

9. A photoelectric sensor as in claim 7 wherein:
   said light receiving means comprises a plurality of phototransistors; and
   said output comprises a transformer which provides
   a. an electrical output signal from any of said plurality of phototransistors that are operative and receive said modulated light; and
   b. no electrical output from any of said plurality of phototransistors that are opened or shorted, even though such phototransistor receives said modulated light.

10. A photoelectric sensor as in claim 7 wherein:
    said light receiving means comprises a second phototransistor;
    said output means comprises a direct current source connected to the center tap of a transformer;
    the collectors of both of said phototransistors are connected to the ends of the center tapped transformer and their emitters are connected to ground through a pair of resistors;
    said transformer prevents the generation of a direct current signal in the output when either of said phototransistor shorts.

* * * * *